(12) United States Patent
Quinn (10) Patent No.: US 10,421,589 B1
(45) Date of Patent: Sep. 24, 2019

(54) SCOOP DOCK AND ASSEMBLY METHODS

(71) Applicant: Plastek Industries, Inc., Erie, PA (US)

(72) Inventor: H Stephen Quinn, Eau Claire, WI (US)

(73) Assignee: Plastek Industries, Inc., Erie, PA (US)

( * ) Notice: Subject to any disclaimer, the term of this patent is extended or adjusted under 35 U.S.C. 154(b) by 204 days.

(21) Appl. No.: 15/594,988

(22) Filed: May 15, 2017

Related U.S. Application Data

(60) Provisional application No. 62/336,060, filed on May 13, 2016.

(51) Int. Cl.
| | | |
|---|---|---|
| *B65D 51/24* | (2006.01) | |
| *B65D 43/16* | (2006.01) | |
| *B65D 43/22* | (2006.01) | |
| *B65D 1/12* | (2006.01) | |
| *A23P 10/40* | (2016.01) | |

(52) U.S. Cl.
CPC ............ *B65D 51/247* (2013.01); *A23P 10/40* (2016.08); *B65D 1/12* (2013.01); *B65D 43/169* (2013.01); *B65D 43/22* (2013.01)

(58) Field of Classification Search
CPC ...... B65D 51/247; B65D 1/12; B65D 43/169; B65D 43/22; A23P 10/40

USPC ....................................................... 220/574.1
See application file for complete search history.

(56) References Cited

U.S. PATENT DOCUMENTS

| | | | | |
|---|---|---|---|---|
| 8,651,311 | B1* | 2/2014 | Drummond .......... | B65D 51/247 220/212 |
| 8,727,149 | B1* | 5/2014 | Reid ..................... | B65D 41/26 215/228 |
| 2006/0000840 | A1 | 1/2006 | Kipperman et al. | |
| 2007/0102061 | A1* | 5/2007 | Tsao ..................... | B65D 77/245 141/380 |
| 2010/0051631 | A1* | 3/2010 | Blomdahl ............ | B65D 51/246 220/735 |
| 2014/0299567 | A1* | 10/2014 | Vogel .................... | B65D 23/12 215/44 |
| 2016/0000270 | A1 | 1/2016 | Wiggins et al. | |
| 2016/0001915 | A1 | 1/2016 | Wiggins et al. | |

\* cited by examiner

*Primary Examiner* — James N Smalley
(74) *Attorney, Agent, or Firm* — Bachman & LaPointe, P.C.

(57) ABSTRACT

A scoop has a bowl (142) and a handle (150). A closure has: a frame (26) for mounting to a container body; a cover (28); and a scoop dock (160) hinged relative to the frame by a dock hinge (200) and holding the scoop.

20 Claims, 13 Drawing Sheets

SCOOP DOCK AND ASSEMBLY METHODS

CROSS-REFERENCE TO RELATED APPLICATION

Benefit is claimed of U.S. Patent Application No. 62/336,060, filed May 13, 2016, and entitled "Scoop Dock and Assembly Methods", the disclosure of which is incorporated by reference herein in its entirety as if set forth at length.

BACKGROUND OF THE INVENTION

The invention relates to dispensing containers. More particularly, the invention relates to dispensing containers for powdered products.

Powdered product is sold in a variety of containers. One exemplary food product is infant formula. Other products include adult meal replacement mixes. Similar containers may be used for household or other chemicals such as powdered detergent, plant food, and so forth.

In recent decades, such products have been sold in containers along with a measuring scoop. In one basic example, the container is a metal can and the scoop is initially packed as loosely within the can. The can is typically sold along with a plastic snap-on cover which is used to close the can once the metal lid is removed (e.g., via can opener).

Such cans have largely been replaced by molded plastic jars with screw-on plastic closures (but also loosely containing a measuring scoop). More recently, dedicated containers have been proposed. In one example, US2006/000840 discloses a molded plastic container having a rounded rectangular planform. The lid includes features for mounting the scoop. The scoop has a round bowl of profile (e.g., radius selected to be complementary to a radius of corner junctions between the sidewall and the base of the container) so as to allow clean scooping of material from the bottom of the container. US2016/000270, the disclosure of which is incorporated by reference herein as if set forth at length, discloses a circular footprint/planform container with scoop dock features on the lid underside.

SUMMARY OF THE INVENTION

One aspect of the disclosure involves an assembly of a scoop and a closure. The A scoop has a bowl and a handle. A closure has: a frame for mounting to a container body; a cover; and a scoop dock hinged relative to the frame by a dock hinge and holding the scoop.

Further embodiments may involve any physically possible combination of the claim elements or other disclosed features below.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements. Various of the drawings include artifacts of computer aided design (CAD) such as stitching lines which may be unseen in the actual container but help illustrate shape.

DETAILED DESCRIPTION

When a prior art container is inverted and shaken for mixing, the powder pushes against the inside of the lid, fills the scoop bowl, and surrounds the scoop handle. The momentum of the powder may distort the lid, which distorts the seals, to cause powder leakage. Also, powder residue may be left on the scoop bowl and scoop handle and lid underside. These problems may be addressed by effectively providing an inner lid and an outer lid and a scoop storage position in the volume between the two.

In an exemplary implementation, the outer lid still provides sealing. In such a situation, the inner lid helps contain the powder but does not necessarily provide a quality seal. Even without providing a seal, the inner lid blunts powder momentum from interfering with the outer lid and reduces the amount of powder that can contact the stored scoop. Nevertheless, the exemplary embodiment involves the inner lid also providing sealing for extra protection, particularly if the outer lid is left open.

Figure 1:
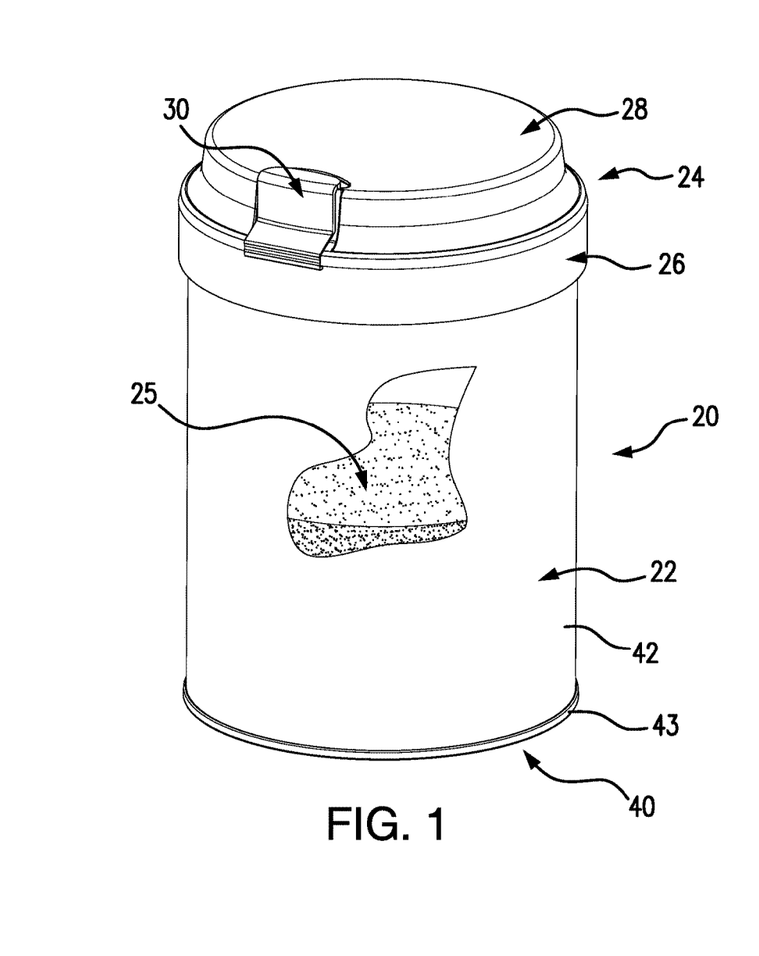
FIG. 1 is a first view of a first container in a cover-closed closed condition with sidewall cut-away to show powder.
Figure 2:
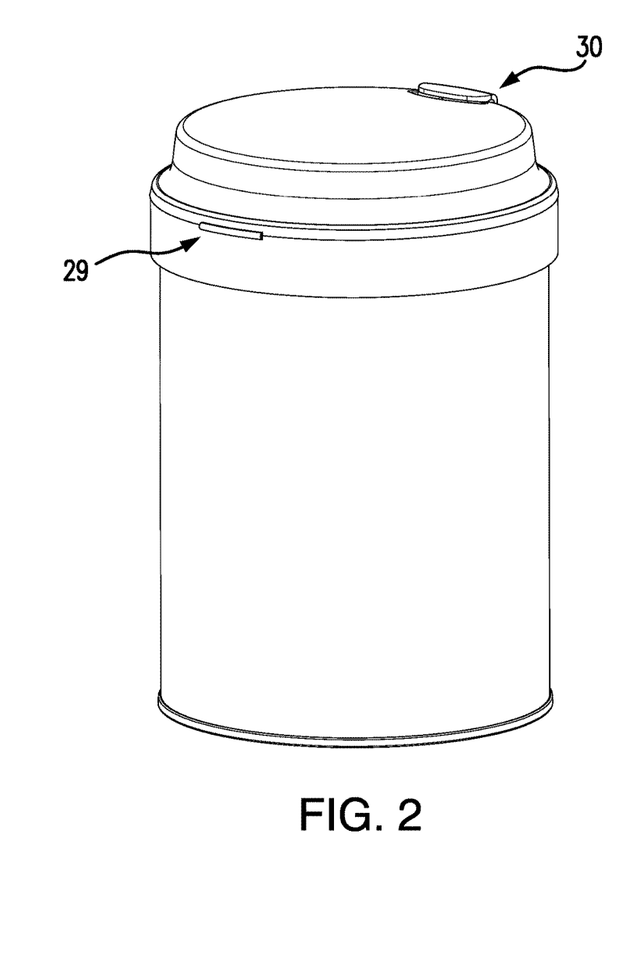
FIG. 2 is a second view of the first container in the cover-closed closed condition.
Figure 3:
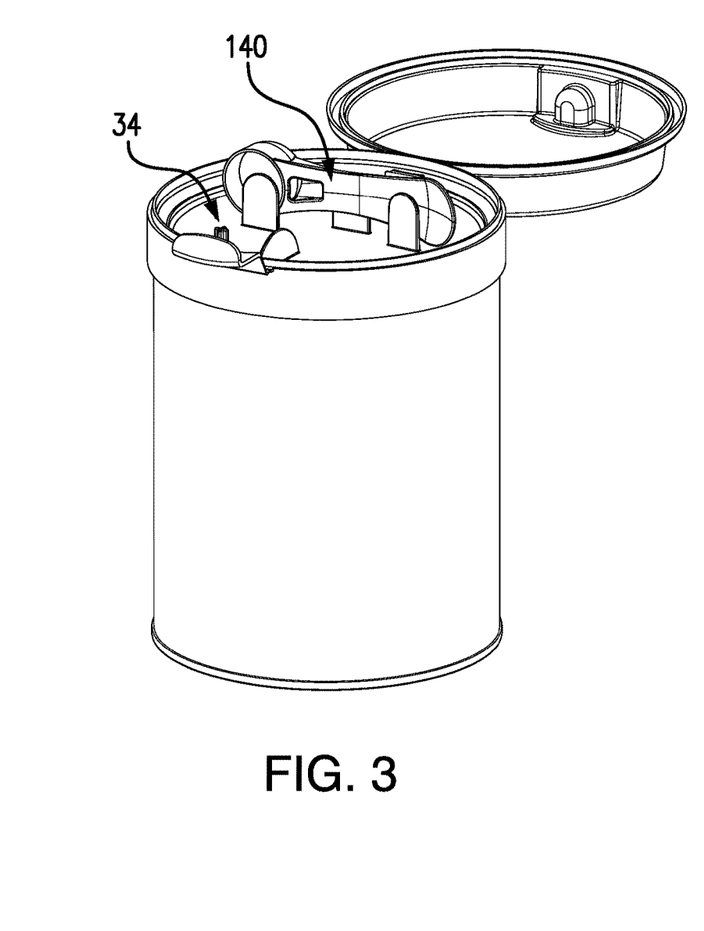
FIG. 3 is a first view of the first container in a cover-opened, scoop-docked, condition.

FIGS. 1 and 2 show an exemplary container assembly 20 having a body 22 and a closure 24 containing a powder 25 (FIG. 1). An exemplary body may comprise a can. One group of cans are essentially metallic (e.g., ignoring coatings). Another group of cans are metal-paper hybrids (e.g., having a metal bottom, a metal top, and a cardboard sidewall (optionally metallic lined)). Initially, the lid may be sealed such as by being a sheetmetal top requiring a can opener to open, or by a sheetmetal top having a pull tab to tear off a portion, or by having a peel-off or tear-off foil seal. Other bodies are molded plastic. An exemplary molded plastic body is an extrusion blow-molded multi-layered tub for beneficial moisture and light blocking.

Figure 4:
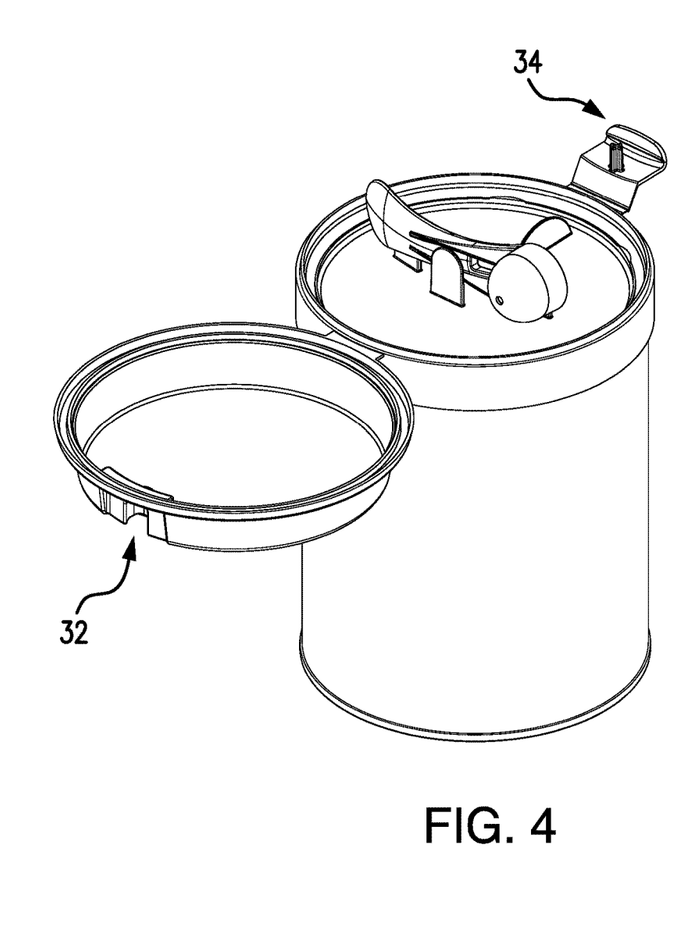
FIG. 4 is a second view of the first container in the cover-opened, scoop-docked, condition.
Figure 5:
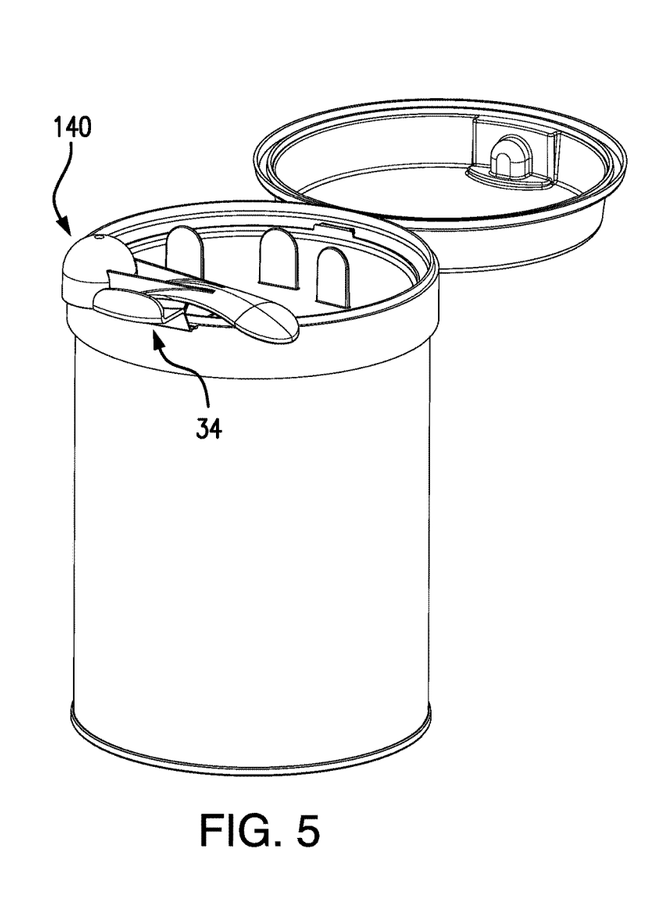
FIG. 5 is a first view of the first container in a cover-opened, scoop-undocked and stowed on a latch, scoop dock-closed, condition.
Figure 6:
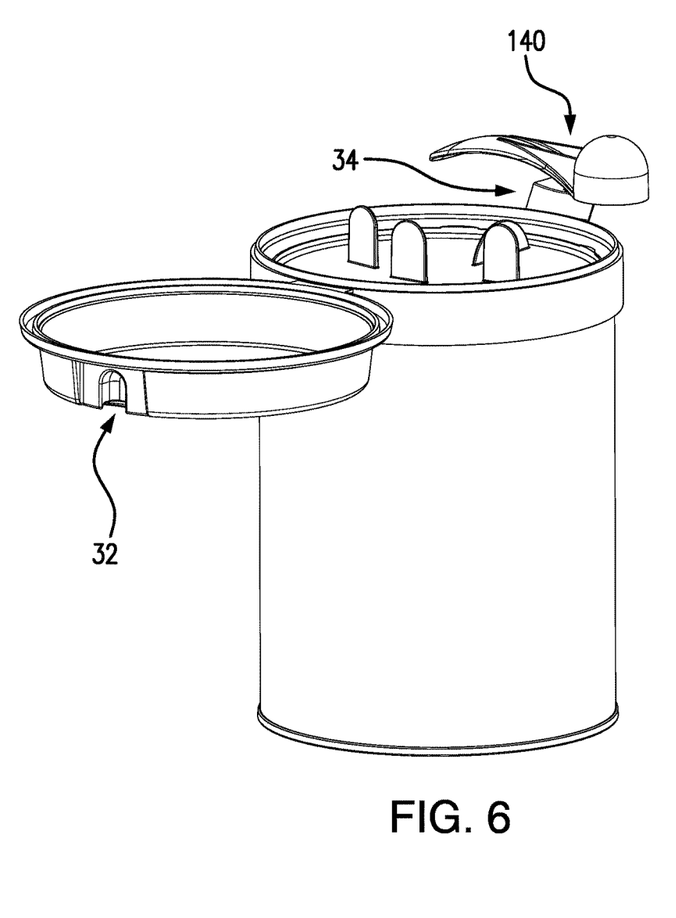
FIG. 6 is a second view of the first container in the cover-opened, scoop-undocked and stowed on a latch, scoop dock-closed, condition.
Figure 7:
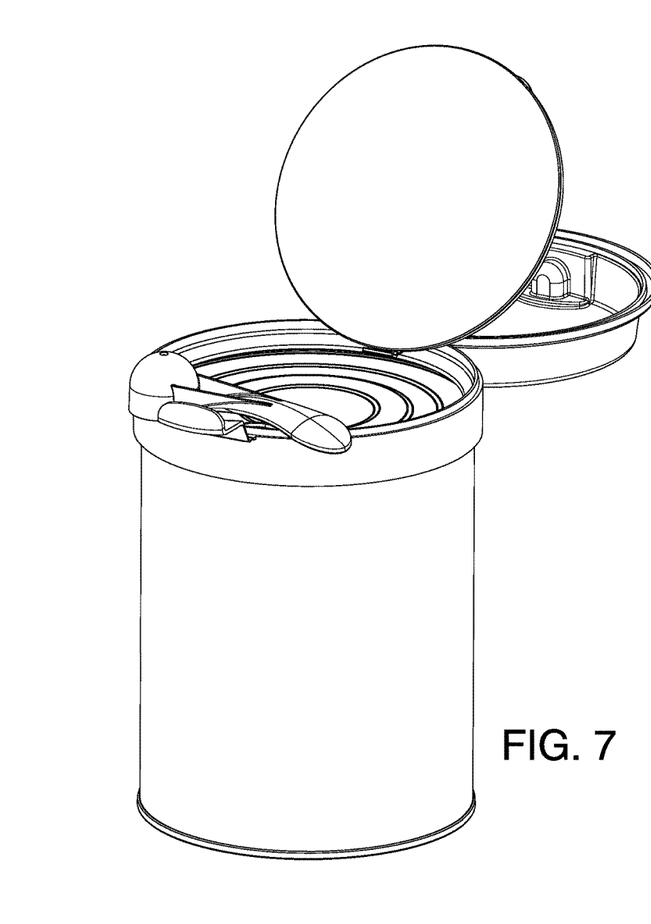
FIG. 7 is a first view of the first container in a cover-opened, scoop-undocked and stowed on the latch, scoop dock-opened, condition prior to can-opening.
Figure 8:
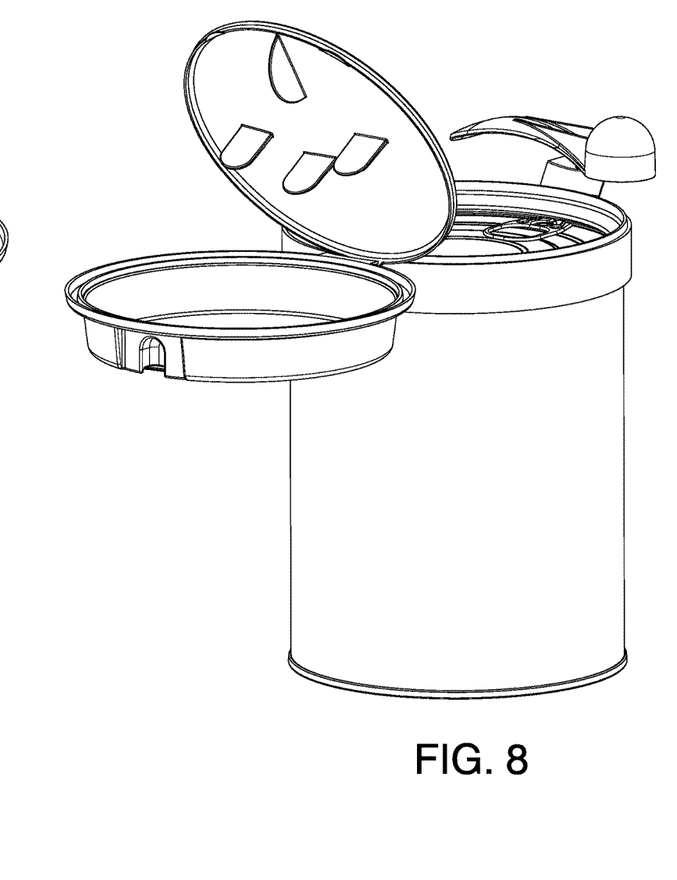
FIG. 8 is a second view of the first container in the cover-opened, scoop-undocked and stowed on the latch, scoop dock-opened, condition prior to can-opening.

The closure 24 comprises a base or frame 26 mounted to the can and a lid/cover 28 (an outer lid/cover as is discussed below) connected to the frame by a living hinge 29 (FIG. 2). The exemplary frame, cover and hinge are unitarily-molded as a single piece (e.g., injection molded polypropylene or other plastic). A two-shot molding process allows the frame and cover to be different colors from each other. A latch 30 may be formed on the lid and frame (e.g., including a latch feature 32 (FIG. 4) of the frame and a latch feature 34 of the lid).

Figures 9, 10:
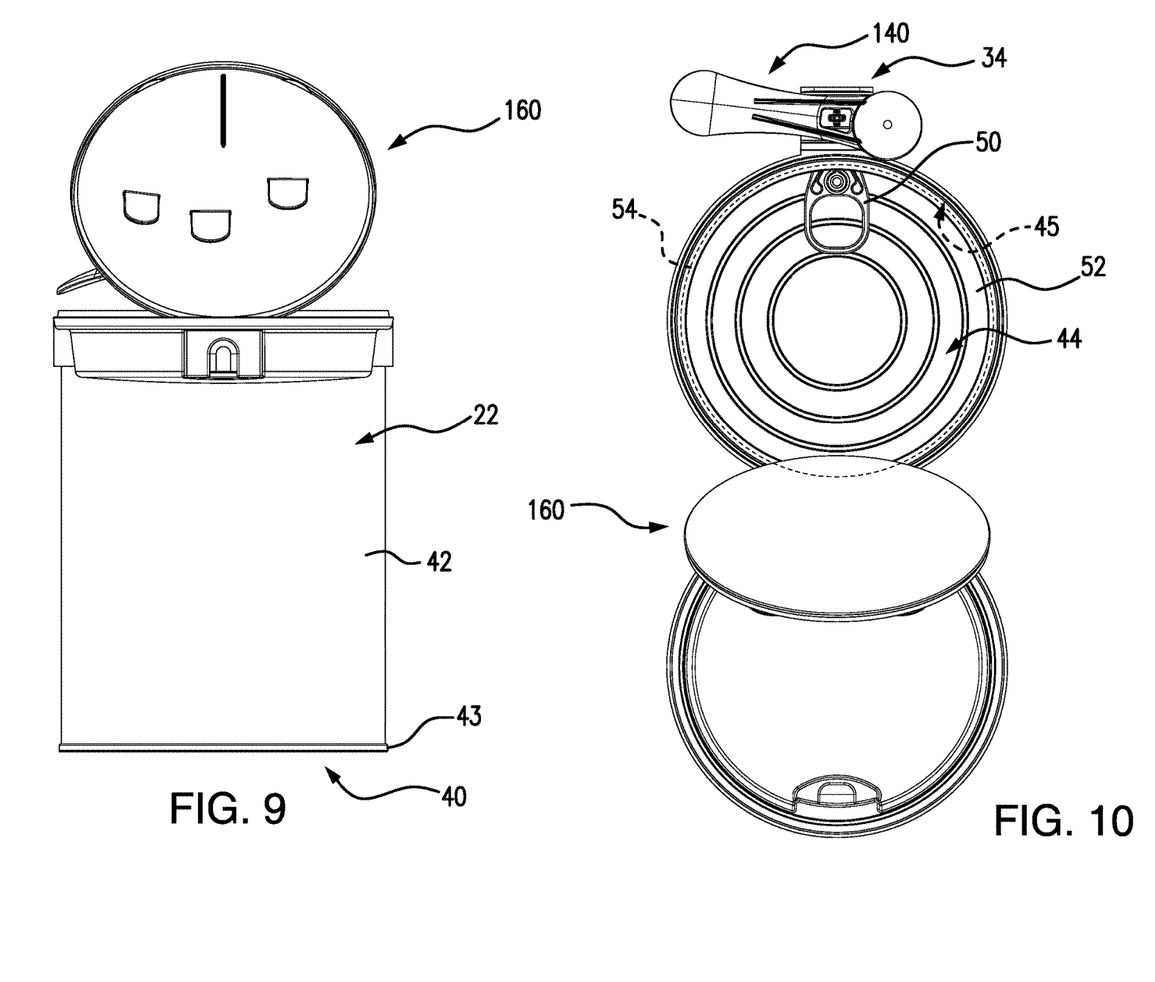
FIG. 9 is a front view of the first container in a cover-opened, scoop-undocked and stowed on the latch, scoop dock-opened, condition prior to can-opening.
FIG. 10 is a top view of the first container in the cover-opened, scoop-undocked and stowed on the latch, scoop dock-opened, condition prior to can-opening.
Figure 16:
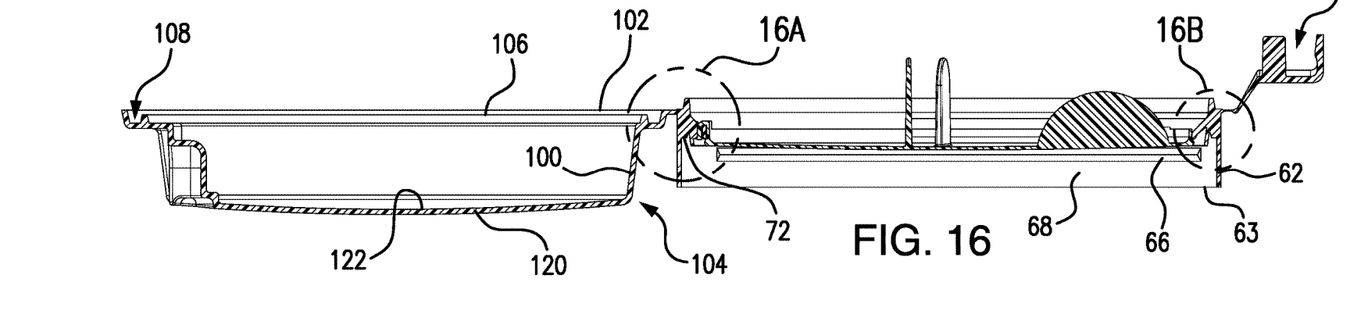
FIG. 16 is a central longitudinal vertical sectional view of the frame and cover shown as the initial subassembly prior to scoop installation and cover closing/latching.
Figure 16A:
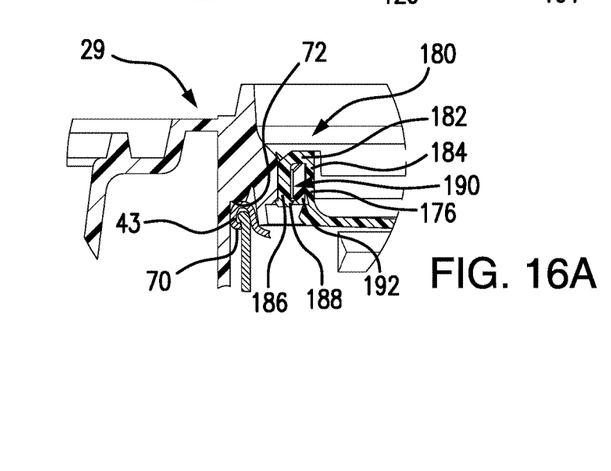
FIG. 16A is a first enlarged view of the frame and cover of FIG. 16.

The exemplary body 22 (FIG. 1) has a base formed by a metallic bottom 40, and a sidewall 42 extending upward from the base to a top 44 (FIG. 10). The exemplary bottom and top include respective perimeter crimps 43 (FIG. 1), 45 (FIG. 16A) grasping the adjacent edge of the sidewall. The top includes a pull tab 50 (FIG. 1) for removing a central portion 52 of the top bounded by a reduced thickness area 54 (e.g., a scored perimeter) leaving the top crimp 45 in place.

The frame planform is complementary to the planform of the body to which it mates (e.g., the can top crimp 45 in the example). To establish a frame of reference, the hinge 29 is formed at a rear of the frame. The exemplary frame has a downwardly open channel cross-section for receiving an upper portion of the container (e.g., receiving the top crimp 45).

The frame (FIG. 16B) has an inner sidewall 60 having a lower rim 61, an outer sidewall 62 (FIG. 16) having a lower rim 63, and an upper channel base or annular web 64 joining the inner and outer sidewalls (e.g., at upper edges thereof).

The frame has features for securing the frame to the body. With the exemplary channel like section, these features may comprise radially-inwardly protruding projections 66 (FIG. 16) on the inboard or inner diameter (ID) surface 68 of the outer sidewall. In the installed condition, such projections may be captured by an underside 70 of the top crimp (and vice versa, capturing the top crimp against the underside 72 of the web 64.

The cover 28 has a sidewall 100 (FIG. 16) extending upward from a lower rim 102 to a shoulder 104. The exemplary rim 102 is an outer rim with an inner rim 106 spaced inwardly. A channel 108 between the ribs receives the upper rim portion of the frame in a closed condition. A top web 120 spans the shoulder and has an underside 122.

Figure 11:
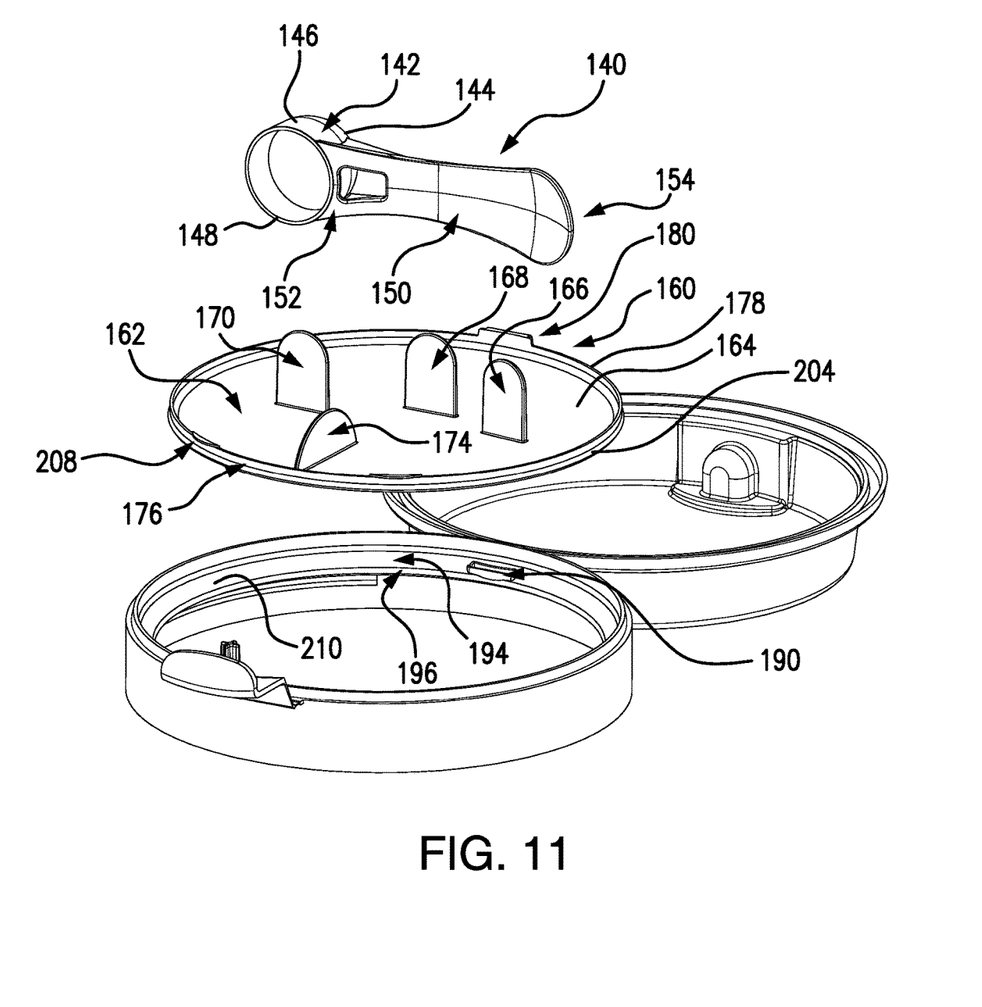
FIG. 11 is a first exploded views of the closure of the container with frame and cover shown in an as-molded condition.
Figure 12:
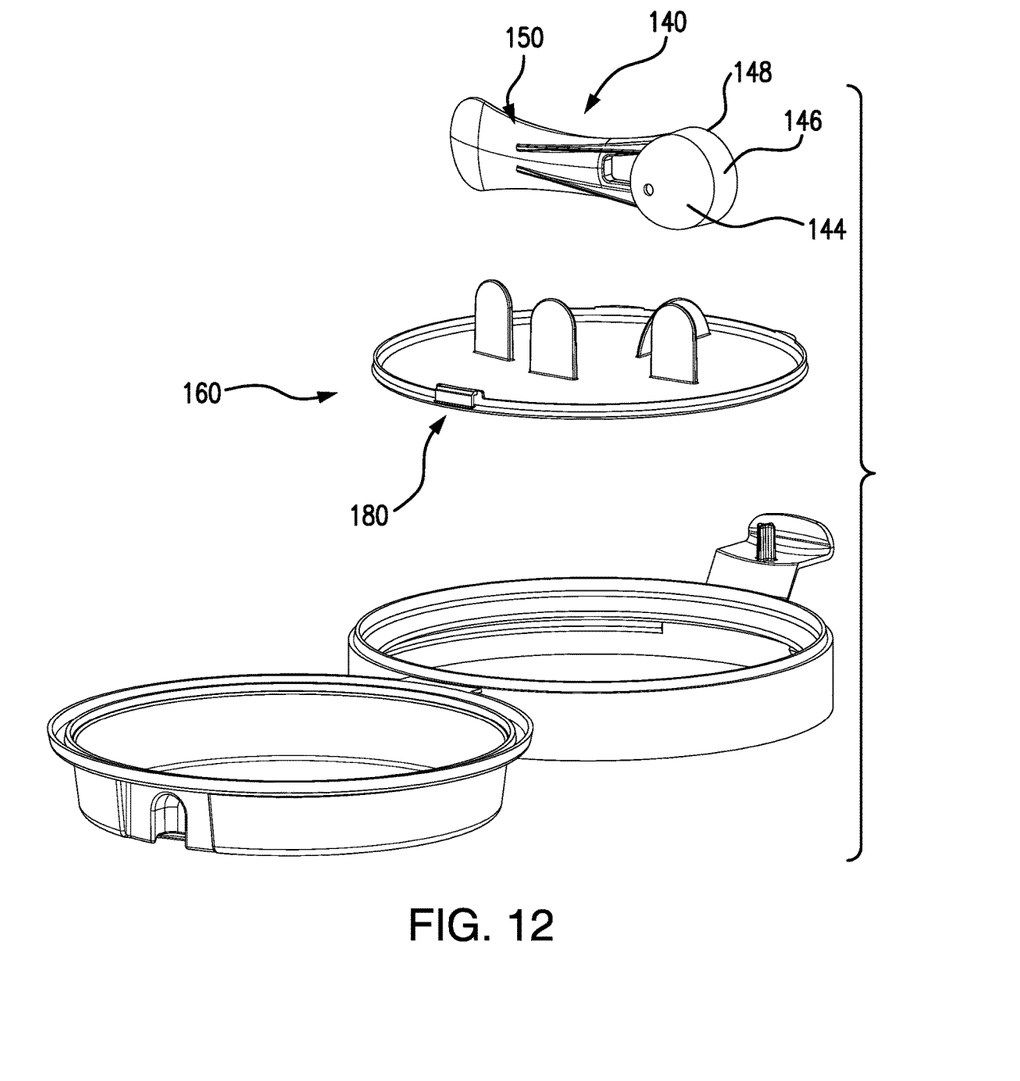
FIG. 12 is a first exploded views of the closure of the container with frame and cover shown in an as-molded condition.
Figure 13:
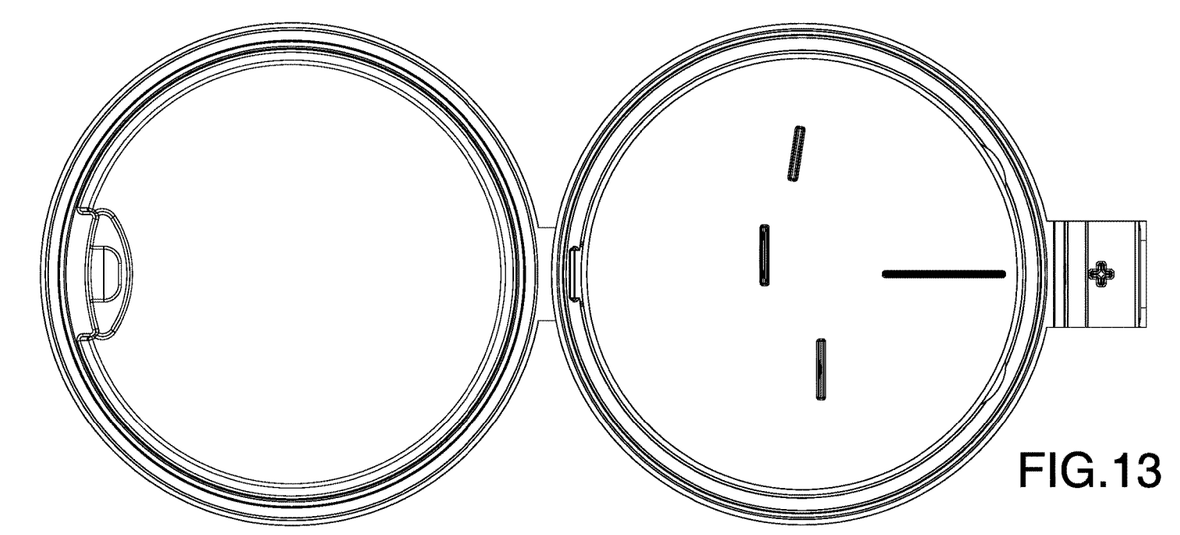
FIG. 13 is a top view of the frame and cover shown as an initial subassembly prior to scoop installation and cover closing/latching. It is particularly evident in the enlarged sectional views that artifacts of computer modeling show certain features as interfering.
Figure 14:
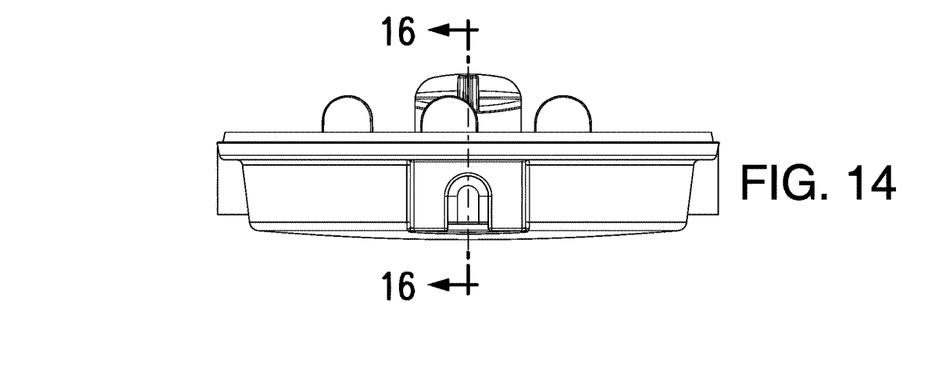
FIG. 14 is a front view of the frame and cover shown as the initial subassembly prior to scoop installation and cover closing/latching.
Figure 15:
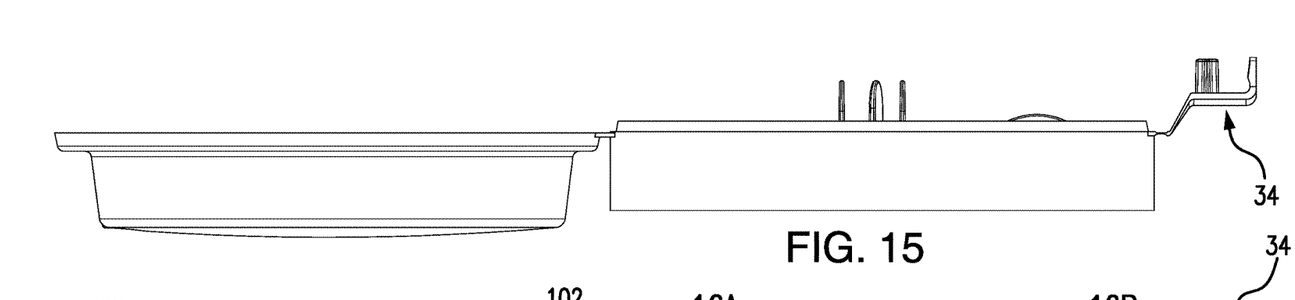
FIG. 15 is a side view of the frame and cover shown as the initial subassembly prior to scoop installation and cover closing/latching.

FIG. 11 further shows a scoop 140 (e.g., a separate plastic injection molding) having a bowl 142 which includes a bottom or base 144 and a sidewall 146 extending from the base 144 to a rim 148 of the bowl. A handle 150 extends from a root at a proximal end 152 at the bowl to a handle end 154.

FIG. 11 further shows a scoop dock 160 for holding the scoop. The dock has a central plate portion 162. An upper surface 164 of the plate portion bears features 166, 168, 170 for holding the scoop. These are shown as fins. A further fin 174 is for finger gripping for opening the scoop dock to expose either the can top or opening. A sidewall 176 extends upward from the plate portion to a rim 178. FIG. 11 further shows the scoop dock as including an integrally formed living hinge 180. The exemplary living hinge 180 comprises a flexible hinging portion 182 at the junction of a proximal wall 184 (extending upward from a remainder of the sidewall 176) and a distal wall 186. A distal portion of the distal wall comprises an enlarged head whose underside forms a barb for backlocking against the underside periphery of a compartment 190 in the frame. The exemplary compartment 190 is formed as an integrally molded through-hole in a boss 192 along a radially inwardly extending flange 194 extending inward and downward to a rim 196 (shown in the illustration of FIGS. 16A and 16B as slightly interfering with the sidewall of the scoop dock 160 due to modeling in a relaxed condition).

Figure 16B:
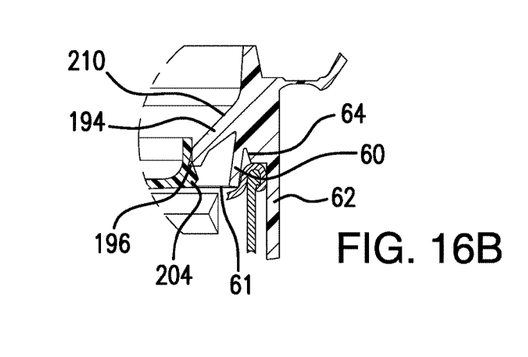
FIG. 16B is a second enlarged view of the frame and cover of FIG. 16.

FIGS. 11 and 16B further show a circumferential bead 204 radially outwardly protruding at a lower end of the sidewall 176. With the scoop dock in its closed condition, the bead becomes captured under the rim 196 of the flange 194. Further downward movement may be prevented by radially outwardly projecting tabs 208 (FIG. 11) at the rim of the sidewall which catch on the upper surface 210 of the flange 194.

The can or other container may be manufactured/filled by conventional processes.

The exemplary closure as shown consists of three molded pieces plastic. The first piece forms the frame and cover or lid (outer cover or lid) including their living hinge 29 and the latching features. The second piece forms the scoop dock (which may serve as an inner cover or inner lid) including its living hinge 180. The third piece forms the scoop.

In one exemplary process, with the first piece in its as-molded condition, the second piece is installed by a translation. The translation brings the dock hinge tab 186 into the complementary frame slot 190, ultimately into a backlocked condition locked by the tab barb or similar feature. The translation also seats the perimeter wall of the dock in a detented closed condition (e.g., with the inner web/flange 194 of the frame captured between the perimeter bead 204 and the pair of tabs 208).

The scoop may then be installed to the dock.

The cover may then be closed and latched.

Accordingly, this process leaves the scoop assembled to the closure ready for installation to the container body.

An exemplary securing to the container body comprises downwardly pressing the closure onto the body so that the projections 66 pass over and ultimately capture the top crimp. An overwrap and other tamper-evident feature may then be applied. Additionally, the closure itself may have been manufactured with one or more tamper-evident features (not shown).

In use, the user may remove any shrink seal, break any tamper-evident feature, and then unlatch the latch 30 and rotates the cover to an open condition (e.g., to or toward the as-molded condition). The user may then remove the scoop and temporarily store it on the frame latch (e.g., by a slot in the scoop handle receiving a latching projection of the latch). The user may then grasp the fin and lift the dock, initially releasing the detent and then shifting to an open condition, exposing the can top.

At first use, the user may open the pull tab or remove a safety foil or the like. The user may then use the scoop to scoop the contents. Once done, the user may place the empty scoop back on the latch. The user may close the scoop dock via return rotation, ultimately reaching the detented closed condition. The scoop may then be reinstalled to the dock. The cover may then be closed and latched.

The scoop dock may act as an inner cover. In the closed condition, it may block at least enough of the opening to act as a baffle to reduce impact inertia with the cover. However, it may be more extensive to form a seal or near seal, covering 90% or more of the frame opening area, more particularly 95% or more or 99% or more. For example, in the illustrated condition it seals and closes all but a very small area near its hinge. The scoop dock thus allows shaking, inverting, etc. with little if any product passing by the dock and contacting the scoop or inertially impacting the cover in such a way to risk compromising sealing between cover and frame. Other embodiments may provide a full seal of the scoop dock. Variations may have the outer lid with features cooperating with the scoop dock so that closing of the outer lid shifts/seats (detents) the scoop dock into its closed condition.

The closure may be designed as a reengineering of a baseline container such as those shown in US2016/000270.

Figure 17:
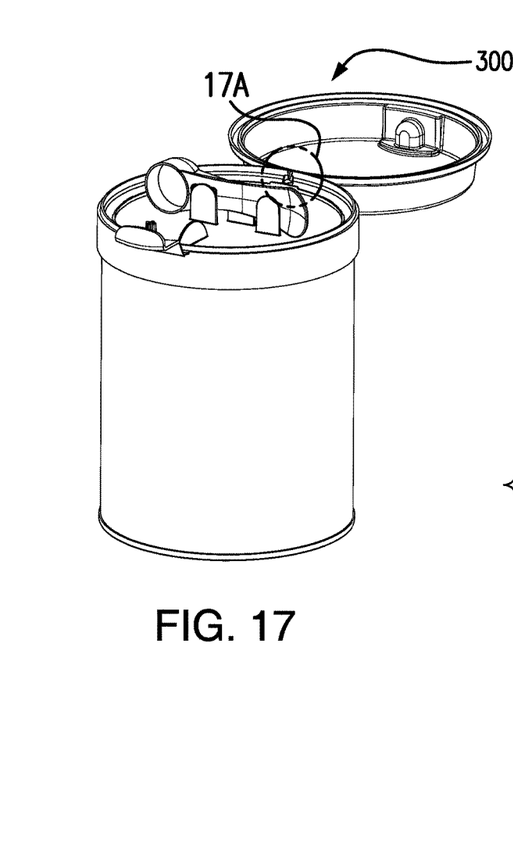
FIG. 17 is a first view of a second closure embodiment in a cover-opened, scoop-docked, condition.
Figure 17A:
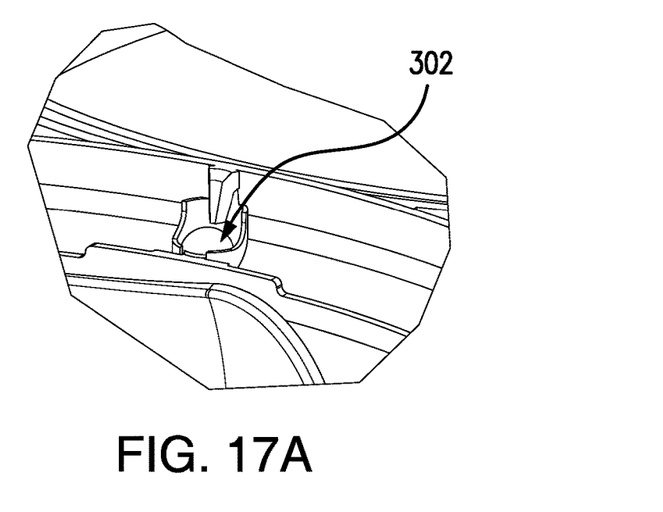
FIG. 17A is a detail view of a socket area of the second closure embodiment of FIG. 18.
Figure 18:
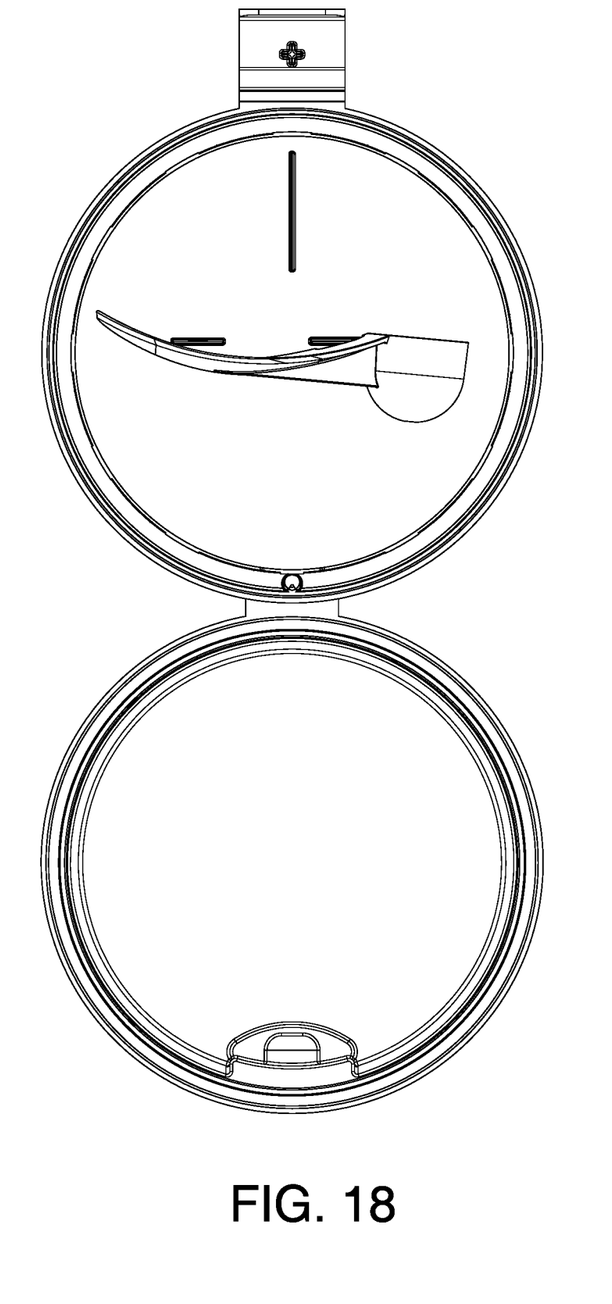
FIG. 18 is a top view of the second closure embodiment in the cover-opened, scoop-docked, condition.
Figures 19, 20:
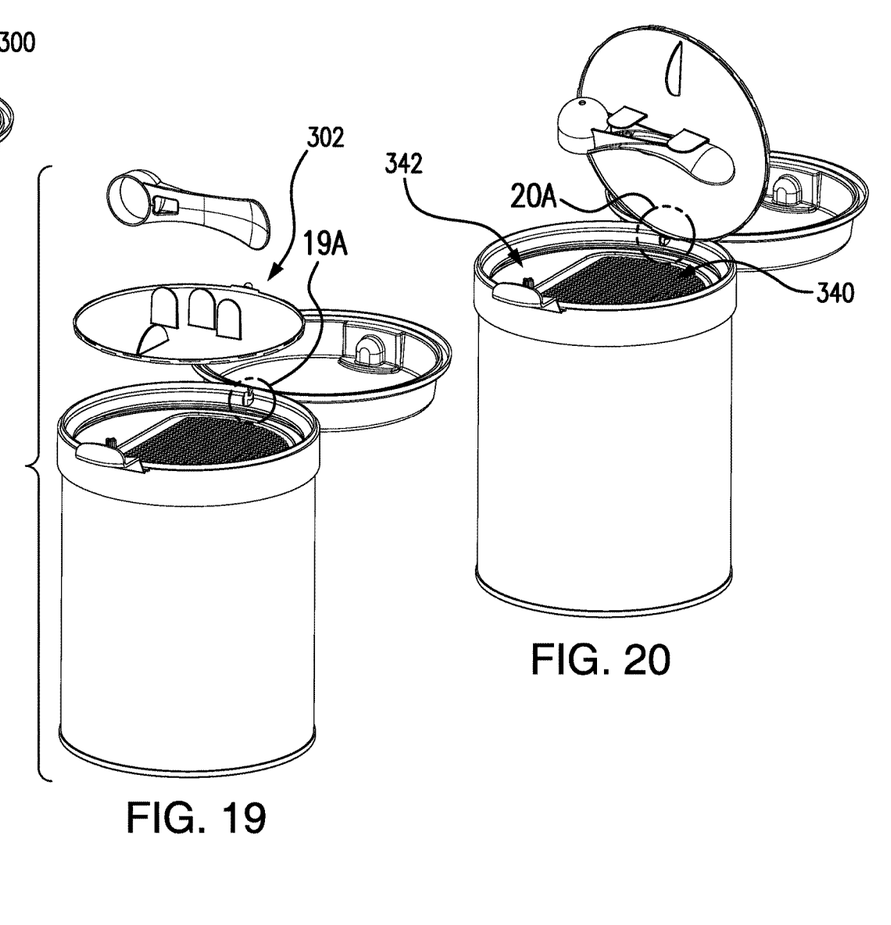
FIG. 19 is an exploded view of the second embodiment in a condition with scoop and dock exploded away.
FIG. 20 is a view of the second embodiment a cover-opened, scoop-docked, but dock reversed condition.
Figure 19A:
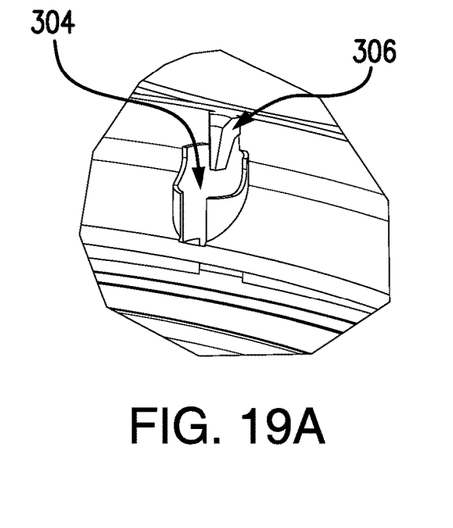
FIG. 19A is a detail view of a socket area of the second closure embodiment of FIG. 19.
Figure 20A:
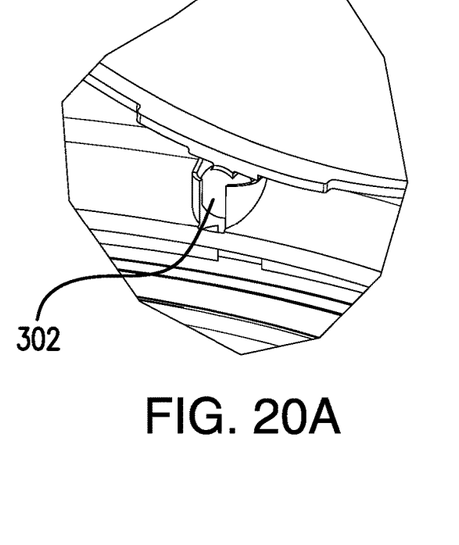
FIG. 20A is a detail view of a socket area of the second closure embodiment of FIG. 20.

FIGS. 17-22 show a second closure embodiment that may otherwise be similar to the first embodiment. Several differences are shown which may be implemented together or independently. The first difference is that the dock living hinge 180 is replaced with a ball 302 (FIG. 17A) and sockets 304 (FIG. 19A) arrangement. The exemplary arrangement has the ball molded as part of the dock and the socket molded as part of the frame. Dock installation by translation as above snaps the ball into the socket where it is retained by a finger 306 of the frame.

Figure 21:
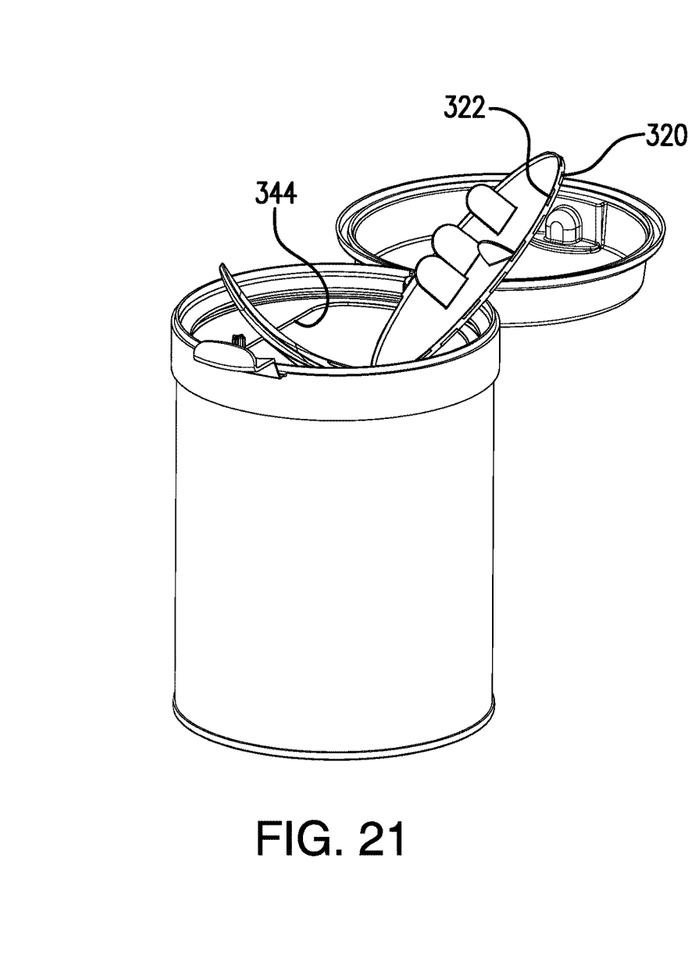
FIG. 21 is a first view of the second embodiment in the cover-opened, foil-removed, scoop dock swiveled, scoop removed condition.
Figure 22:
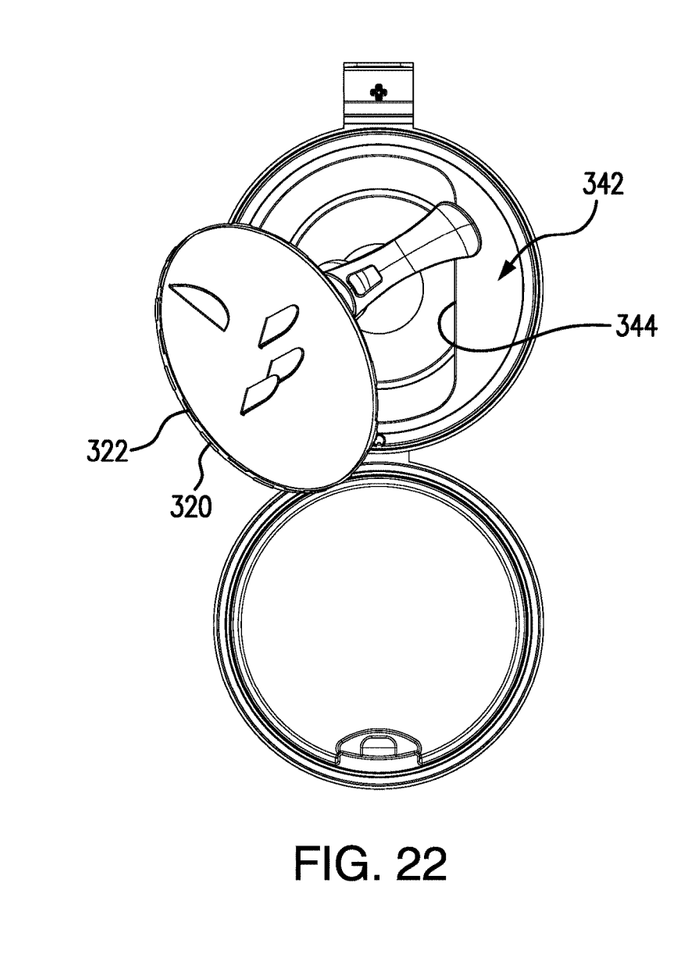
FIG. 22 is a top view of the second embodiment in the cover-opened, foil-removed, scoop dock swiveled, scoop removed condition (container shown empty).

The second difference is the detenting features of the dock. The first embodiment's continuous perimeter bead 204 is replaced with a lower interrupted bead or segmented short radial flange 320 (FIG. 21). The pair of tabs 208 are replaced with a similarly upper interrupted bead or segmented short radial flange 322 whose segments are out of phase with those of the lower. The inter-segment gaps for each are of greater angular span than the aligned segments of the other. This allows easy molding with a vertical die pull. An exemplary number of segments is at least 6. One aspect of use ease is that the dock can be lifted and swiveled in various locations and while keeping the scoop accessible to the user/consumer without removing the scoop first, then opening the dock, and then re-gripping scoop, etc.

The third difference is that the essentially circular sheet metal pull top (a central portion of the can top removable at a score) is replaced with a removable (peel away) foil 340. The illustrated foil is scored for removal not along a full circumference, but to leave a portion 342 having an edge 344 (FIG. 21) along a chord for scraping/leveling a scoop. Although this is shown, the particular ball joint embodiment allows the dock to be shifted partially off to the side (FIGS. 21 and 22) so that the edge of the dock is over the can opening to allow the dock edge to be used for leveling. Thus, the ball joint embodiment is also particularly useful with the full circular opening top or foil in addition to the illustrated foil.

One or more embodiments of the present invention have been described. Nevertheless, it will be understood that various modifications may be made without departing from the spirit and scope of the invention. For example, when implemented in the modification of an existing container configuration, details of the existing configuration or its use may influence details of any particular implementation. Accordingly, other embodiments are within the scope of the following claims.

What is claimed is:
1. A closure and scoop assembly comprising:
a scoop comprising a bowl (142) and a handle (150); and
a closure (24; 300) comprising:
   a frame (26) for mounting to a container body;
   a cover (28); and
   a scoop dock (160) hinged relative to the frame by a dock hinge (180; 302, 304, 306) and holding the scoop, wherein the scoop dock is hingedly shiftable between:
      a closed condition and an open condition.

2. The assembly of claim 1 further comprising:
a cover hinge (29) connecting the cover to the frame.

3. The assembly of claim 2 wherein:
the cover hinge and dock hinge are living hinges with respective hinge axes parallel to each other.

4. The assembly of claim 2 wherein:
the frame, cover, and cover hinge are unitarily molded as a first piece; and
the scoop dock and dock hinge are unitarily molded as a second piece.

5. The assembly of claim 2 wherein:
the cover hinge is a living hinge; and
the dock hinge is a ball and socket hinge.

6. The assembly of claim 5 wherein:
the dock hinge has multiple degrees of freedom.

7. The assembly of claim 1 further comprising:
a latch (30) having a first portion (32) on the cover and a second portion (34) on the frame, the first portion releasably matable to the first portion to retain the cover in a closed condition and release to allow the cover to shift to an open condition.

8. The assembly of claim 1 wherein the scoop dock comprises:
a plate portion having a first face (164) and a second face; and
a plurality of scoop retaining features (166, 168, 170, 174) on the first face holding the scoop.

9. The assembly of claim 8 wherein:
the scoop retaining features comprise fins.

10. The assembly of claim 1 wherein:
in the scoop dock's closed condition, the scoop dock blocks at least 95% of an opening area of the frame.

11. The assembly of claim 1 further comprising:
a detent mechanism (196, 204; 196, 320, 322) for detenting the scoop dock closed condition.

12. A container comprising the assembly of claim 1 and further comprising:

a container body to which the frame is mated; and
product contained within the container body.

13. The container of claim 12 wherein:
the container body is a can.

14. A closure and scoop assembly comprising:
a scoop comprising a bowl and a handle; and
a closure comprising:
   a frame for mounting to a container body;
   a cover; and
   a scoop dock hinged relative to the frame by a dock hinge and holding the scoop, the dock hinge having an end portion received in a slot in the frame.

15. A method for using a container, the container comprising:
   a closure and scoop assembly comprising:
      a scoop comprising a bowl and a handle; and
      a closure comprising:
         a frame for mounting to a container body;
         a cover (28); and
         a scoop dock hinged relative to the frame by a dock hinge and holding the scoop;
   a container body to which the frame is mated; and
   product contained within the container body,
the method comprising:
   shifting the cover from a closed condition to an open condition;
   removing the scoop from the scoop dock;
   shifting the scoop dock from a closed condition to an open condition; and
   scooping the product from the container body.

16. The method of claim 15 further comprising:
unlatching a latch between the frame and the cover and wherein the shifting of the cover comprises a hinged shift.

17. The method of claim 15 wherein:
the shifting of the scoop dock comprises undetenting from the scoop dock closed condition.

18. The method of claim 17 further comprising:
the returning the scoop dock to its closed condition;
reinstalling the scoop to the scoop dock; and
returning the cover to its closed condition.

19. The method of claim 17 wherein:
the shifting of the scoop dock comprises pulling on a fin of the scoop dock.

20. A closure and scoop assembly comprising:
a scoop comprising a bowl and a handle; and
a closure comprising:
   a frame for mounting to a container body;
   a cover;
   a cover hinge connecting the cover to the frame, the cover hinge being a living hinge; and
   a scoop dock hinged relative to the frame by a dock hinge and holding the scoop, the dock hinge being a ball and socket hinge.

* * * * *